US006982526B2

(12) United States Patent
Schallmoser

(10) Patent No.: US 6,982,526 B2
(45) Date of Patent: Jan. 3, 2006

(54) DIELECTRIC BARRIER DISCHARGE LAMP AND METHOD AND CIRCUIT FOR IGNITING AND OPERATING SAID LAMP

(75) Inventor: Oskar Schallmoser, Augsburg (DE)

(73) Assignee: Patent Treuhand Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/475,650

(22) PCT Filed: Sep. 5, 2002

(86) PCT No.: PCT/DE02/03279

§ 371 (c)(1),
(2), (4) Date: Oct. 23, 2003

(87) PCT Pub. No.: WO03/032362

PCT Pub. Date: Apr. 17, 2003

(65) Prior Publication Data

US 2004/0183455 A1   Sep. 23, 2004

(30) Foreign Application Priority Data

Sep. 28, 2001  (DE) ................................ 101 47 961

(51) Int. Cl.
H05B 37/02   (2006.01)
(52) U.S. Cl. ...................................... 315/219; 315/246
(58) Field of Classification Search ................ 315/219, 315/246, 276, 283, 291, DIG. 7; 313/581, 313/620–621, 631–632
See application file for complete search history.

(56) References Cited

U.S. PATENT DOCUMENTS

| | | | |
|---|---|---|---|
| 5,006,758 A | 4/1991 | Gellert et al. ................ 313/634 |
| 5,604,410 A | 2/1997 | Vollkommer et al. ....... 315/246 |
| 5,666,026 A * | 9/1997 | Matsuno et al. ............ 313/634 |
| 5,757,132 A * | 5/1998 | Matsuno et al. ............ 313/607 |
| 6,034,470 A | 3/2000 | Vollkommer et al. ....... 313/485 |
| 6,060,828 A | 5/2000 | Vollkommer et al. ....... 313/607 |
| 6,097,155 A | 8/2000 | Vollkommer et al. ......... 315/58 |
| 6,323,600 B1 | 11/2001 | Statnic et al. ........... 315/209 R |
| 6,356,033 B1 * | 3/2002 | Okamoto et al. ....... 315/209 R |
| 6,437,494 B1 * | 8/2002 | Inayoshi ..................... 313/234 |
| 6,495,972 B1 * | 12/2002 | Okamoto et al. ........... 315/291 |
| 6,531,822 B1 * | 3/2003 | Vollkommer et al. ....... 313/634 |
| 6,541,924 B1 * | 4/2003 | Kane et al. ................. 315/246 |

FOREIGN PATENT DOCUMENTS

WO  WO 99/05892  2/1999
WO  WO 00/58998  10/2000

* cited by examiner

Primary Examiner—Thuy Vinh Tran

(57) ABSTRACT

An elongated electrode of a dielectric barrier discharge lamp is divided into two component electrodes (A, A') by a gap (L). The two component electrodes (A, A') are driven in an ignition phase in such a way that an auxiliary discharge that facilitates the ignition of the main discharge (E) in the region of the electrode gap (L), in particular when the lamp is in the dark. In normal operation, the component electrodes (A, A') are driven in such a way that they contribute to the generation of the main discharge (E).

8 Claims, 1 Drawing Sheet

DIELECTRIC BARRIER DISCHARGE LAMP AND METHOD AND CIRCUIT FOR IGNITING AND OPERATING SAID LAMP

TECHNICAL FIELD

The invention relates to a dielectric barrier discharge lamp and a method for igniting and operating this lamp, and to a circuit arrangement suitable for carrying out the method.

Dielectric barrier discharge lamps are sources of electromagnetic radiation based on dielectrically impeded gas discharges.

A dielectric barrier discharge lamp necessarily presupposes at least one so-called dielectrically impeded electrode. A dielectrically impeded electrode is separated from the interior of the discharge vessel by means of a dielectric barrier. This dielectric barrier can be designed, for example, as a dielectric layer covering the electrode, or it is formed by the discharge vessel of the lamp itself, specifically when the electrode is arranged on the outer wall of the discharge vessel.

Because of the dielectric barrier, the operation of such lamps requires a time-variable voltage between the electrodes, for example a sinusoidal AC voltage or a pulsed voltage, as disclosed in U.S. Pat. No. 5,604,410.

The shape of the discharge vessel is in principle arbitrary, for example tubular or flat. In particular, the invention also relates to so-called flat lamps and tubular lamps with or without aperture.

In flat lamps, the discharge vessel is formed substantially by a base plate and a front plate connected thereto. The light emission is usually performed through the front plate. Flat lamps are suitable, in particular, for large-area lighting tasks, for example for the direct backlighting of displays, for example liquid crystal displays, but also for general lighting.

In the case of tubular lamps, the discharge vessel is formed from a tube that is sealed at both ends. The light emission is either through the entire lateral surface of the discharge tube, or only through an elongated aperture (aperture lamp). Aperture lamps are used, in particular, in appliances for office automation (OA), for example color copiers and color scanners, for signal lighting, for example as brake and direction indicator lights in automobiles, for auxiliary lighting, for example the inner lighting of automobiles, and for background lighting of displays, for example liquid crystal displays, as so-called edge type backlights.

The discharge vessel is usually filled with an inert gas, for example xenon, or a gas mixture. So-called excimers are formed during the gas discharge, which is preferably operated by means of a pulse operating method described in U.S. Pat. No. 5,604,410. Excimers are excited molecules, for example $Xe_2^*$, that emit electromagnetic radiation when returning to the ground state, which is unbound as a rule. In the case of $Xe_2^*$, the maximum molecular band radiation is approximately 172 nm (VUV radiation).

PRIOR ART

U.S. Pat. No. 6,034,470 discloses a flat lamp with dielectrically impeded electrodes. The discharge vessel of the lamp comprises a base plate and a front plate that are connected to one another in a gas-tight fashion via a circumferential frame. The base plate is provided with a light-reflecting layer, that is to say only the front plate serves for coupling out light. The inner wall of the base plate as well as the front plate are coated with a phosphor layer (see FIG. 6b). A high luminous efficiency and/or a high luminance is thereby achieved on the front plate. However, the long ignition delay after the application of the voltage to the electrodes of the lamp is disadvantageous when the lamp is in the dark, for example inside an LCD display. It can even happen after a lengthy time in the dark that the lamp can be ignited only with the aid of a voltage that is substantially higher by comparison with normal operation.

U.S. Pat. No. 5,006,758 discloses a flat lamp with dielectrically impeded pairs of electrodes that are connected in pairs to the two poles of a high-voltage source. The electrodes comprise wires and are embedded in a flat glass dielectric. Creeping discharges form during operation on the dielectric surface between respectively neighboring electrode wires. A coating is applied to the dielectric surface in order to lower the ignition voltage for the discharge. The material for the coating comprises the oxides of magnesium, ytterbium, lanthanum and cerium ($MgO$, $Yb_2O_3$, $La_2O_3$, $CeO_2$). A phosphor layer is applied to the outer wall of the transparent plate situated opposite the glass dielectric. It is disadvantageous that because of the coating for lowering the ignition voltage the dielectric surface has no phosphor layer, as a result of which a portion of the maximum possible luminous efficiency is sacrificed.

U.S. Pat. No. 6,097,155 discloses a dielectric barrier discharge lamp of the type mentioned at the beginning. The lamp has a tubular discharge vessel on whose inner and/or outer walls at least two elongated electrodes resembling conductor tracks are arranged parallel to the longitudinal axis of the discharge vessel. Ignition problems also arise with this lamp in the dark, for example inside an OA appliance.

SUMMARY OF THE INVENTION

The object of the present invention is to provide a method for igniting and operating a dielectric barrier discharge lamp in accordance with the preamble of claim 1, which method effects both a high level of luminous efficacy and an improved ignition response of the lamp.

This object is achieved by means of the features of claim 1. Particularly advantageous refinements are to be found in the claims dependent on claim 1.

A further object of the present invention consists in specifying a circuit arrangement suitable for carrying out the method.

This object is achieved by means of the features of the independent claim directed at the circuit arrangement. Particularly advantageous refinements are to be found in the claims dependent thereon.

Protection is also claimed for a lamp suitable for the method, as well as a lighting system comprising lamp and circuit arrangement.

The method according to the invention for igniting and operating a dielectric barrier discharge lamp with elongated electrodes proposes dividing at least one elongated electrode into two component electrodes by a gap, and executing the following method steps on this lamp modified in this way.

In an ignition phase, an ignition voltage is applied between the two component electrodes in such a way that an auxiliary discharge is ignited in the region of the electrode gap between the two component electrodes.

In the subsequent normal operation, an operating voltage is applied between the electrodes in such a way that a main discharge burns between the electrodes.

The advantage of this method consists inter alia in facilitating the ignition of the main discharge by means of the already burning auxiliary discharge. As a result, the operating voltage need not be increased during the ignition phase, even in darkness. Consequently, the extra outlay on higher electric strength otherwise required when designing the lamp voltage generator supplying the operating voltage can be avoided. Only the drive circuit for the electrode gap for igniting the auxiliary discharge must be designed to be of suitably high electric strength, in order to ensure reliable ignition. However, the voltage level required for igniting the auxiliary discharge can be limited by relatively simple measures. Thus, the electrode gap is preferably selected to be smaller than the distance from the nearest electrode, or smaller than the spacing of the electrodes of opposite polarity between which the main discharge burns in normal operation. This ensures that the ignition voltage of the auxiliary discharge is lower than the ignition voltage of the main discharge without the aid of the auxiliary discharge. Moreover, it is possible even in the case of the ends of the component electrodes bounding the electrode gap to dispense entirely with the dielectric impediment (dielectrically unimpeded auxiliary discharge), or for only one end to be dielectrically impeded (auxiliary discharge dielectrically impeded at one end). Such a dielectrically unimpeded auxiliary discharge has the advantage of a particularly low ignition voltage, although this is at the cost of a more intense contamination through sputter processes in the region of the two component electrode ends. It can therefore also be advantageous in this regard to provide the complete gap, but at least the component electrode ends, with a dielectric layer (auxiliary discharge impeded dielectrically at both ends), and to accept the somewhat higher ignition voltage resulting thereby for the auxiliary discharge. The power turnover in the auxiliary discharge, which is substantially lower by comparison with the main discharge, is likewise also advantageous. The drive circuit for the auxiliary discharge can therefore be of correspondingly smaller dimensions, and therefore more cost-effective.

A further advantage is that, apart from the gap in one electrode—or also a plurality of electrode gaps, if required—there is no need for further modifications inside the discharge vessel of the lamp. It is thereby largely possible to avoid negative effects on the number of lumens per lamp, as in U.S. Pat. No. 5,006,758 cited at the beginning, for example.

In normal operation, the value of the voltage between the two component electrodes is preferably selected to be lower than the ignition voltage and/or the maintenance voltage of the auxiliary discharge. The auxiliary discharge is therefore extinguished in normal operation. This has the advantage that the main discharge and the homogeneity of the luminance of the lamp are not influenced as a whole and, moreover, the drive circuit for the auxiliary discharge is de-energized in normal operation. It is particularly preferred to select the value of the voltage between the two component electrodes to be sufficiently low in normal operation in order to avoid any influence being exerted on the main discharge. It has proved to be particularly advantageous, in normal operation, to keep the two component electrodes at substantially the same electric potential.

Moreover, in normal operation, the operating voltage is preferably also applied between the bipartite electrode and its counter-electrode. As a result, the main discharge also extends between each component electrode and its neighboring counter-electrode. This has the advantage that the bipartite electrode not only functions for the purpose of ignition, but also contributes to the generation of the main discharge, that is to say functions like a normal electrode in normal operation.

Moreover, the operating voltage is preferably tuned to a pulsed active-power coupling into the gas discharge, whose pulse and interpulse speeds are selected in such a way that the mains discharge comprises numerous partial discharges. Reference is made to U.S. Pat. No. 5,604,410, already cited, for further details. It has proved advantageous, furthermore, in this context to provide the counter-electrode of the bipartite electrode and/or the bipartite electrode itself with means for locating these partial discharges. In this case, the electrode gap is preferably positioned between two of the means, that is to say between two partial discharges burning during operation. In this way, the original partial discharge pattern of the main discharge remains unchanged by the electrode gap. The means for locating partial discharges can be implemented, for example, by nose-like projections that are arranged at a mutual spacing at least along the electrodes of one polarity. Reference is made to U.S. Pat. No. 6,060,828 for further details on this.

A circuit arrangement for carrying out the method explained above has an ignition circuit for generating the ignition voltage for the auxiliary discharge, as well as a lamp voltage generator that is designed for generating the operating voltage for the main discharge. The ignition voltage is tapped at the two terminals of the secondary side of an ignition transformer. The primary side of the ignition transformer is fed from a DC voltage source via a first means for applying a voltage. The first means is, for example, implemented by a controllable switch connected to one terminal of the primary side of the ignition transformer. Moreover, the ignition circuit has a second means for short-circuiting the primary side of the ignition transformer. The second means is, for example, a controllable switch connected in parallel with the primary winding of the ignition transformer. A conventional coil transformer or a piezoelectric transformer comes into consideration as an ignition transformer.

For a complete lighting system, the first terminal of the secondary side of the ignition transformer is connected to one component electrode of the dielectric barrier discharge lamp. The second terminal of the secondary side and the first output of the lamp voltage generator are connected to the other component electrode and to the undivided electrodes of a first polarity. The second output of the lamp voltage generator is, finally, connected to the electrodes of a second polarity.

The elongated electrodes of the dielectric barrier discharge lamp are implemented, for example, as electrode tracks arranged on the wall of the discharge vessel. These electrode tracks can, for example, be printed on by means of current printing technology (silk-screen printing, stencil printing). The electrode gap divides the relevant electrode track into two component electrode tracks in the longitudinal direction.

BRIEF DESCRIPTION OF THE DRAWINGS

The aim below is to explain the invention in more detail with the aid of an exemplary embodiment. In the drawing.

PREFERRED EMBODIMENT OF THE INVENTION

Figure 1:
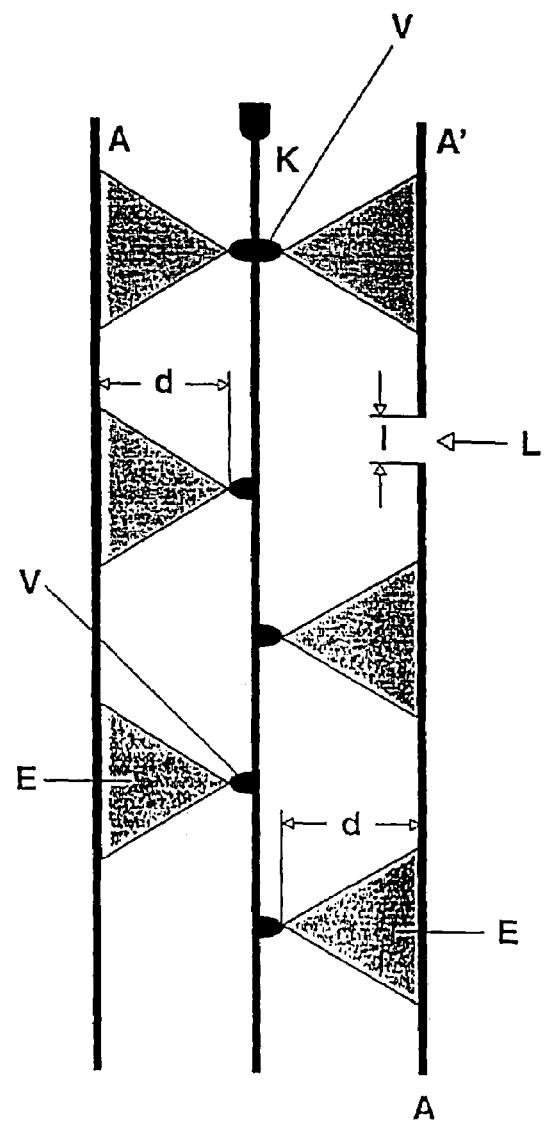
FIG. 1 shows a detail of an electrode design for a flat dielectric barrier discharge lamp.

FIG. 1 shows a detail of an electrode design for a flat dielectric barrier discharge lamp. The electrode design is intended for operation with unipolar voltage pulses, and has for this purpose a number of anode tracks A and cathode tracks K that are printed on the base plate of the flat lamp (not illustrated here). There is always one cathode track arranged between two anode tracks in this case. For the sake of clarity, only one detail is illustrated with two anode tracks and one cathode track. The electrode tracks are covered with a thin glass layer (not illustrated) acting as dielectric barrier. Each cathode track K has projections V on both sides, which serve as means for locating the triangular partial discharges E burning during operation. The right-hand anode track in FIG. 1 is divided into the two component anode tracks A and A' by the gap L, which interrupts this anode track. The length l of the electrode gap L is approximately 0.8 mm. Located to the left of the cathode track K is a further anode track A, which is, however, unipartite. The smallest space d between the (component) anode tracks A, A' and the respectively nearest cathode track K is approximately 6 mm. Depending on the size of the base plate, this detail of the electrode design is multiply repeated and essentially covers the entire inner side of the base plate. However, as a rule a single anode track, or in the case of very large area flat lamps, a few anode tracks with such an electrode gap suffice(s) to support the ignition of the main discharge. The anode tracks and cathode tracks are connected in the edge region of the flat lamp to common supply leads (not illustrated). The mode of operation of this electrode design will become clear together with the circuit arrangement of FIG. 2 explained below.

Figure 2:
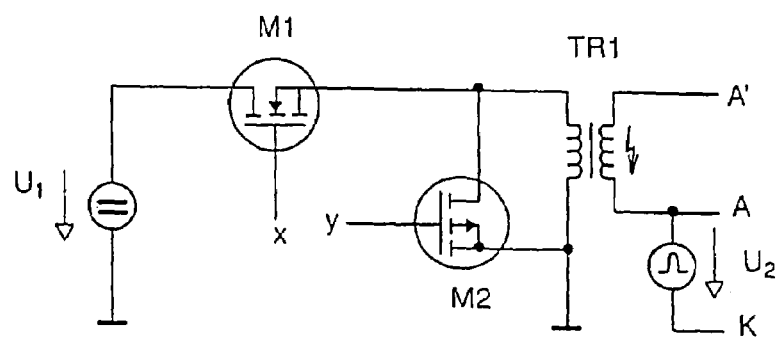
FIG. 2 shows a simplified electric circuit diagram of a circuit arrangement for igniting and operating a dielectric barrier discharge lamp having an electrode design according to FIG. 1.

The circuit arrangement illustrated in a simplified form in FIG. 2 has an ignition transformer TR1. The primary circuit is fed from a DC voltage source U1 that is connected via a first field-effect transistor (FET) M1 to the two terminals of the primary winding of the ignition transformer TR1. A second field-effect transistor M2 is connected in parallel with the primary winding. A first terminal of the secondary winding of the ignition transformer TR1 is connected to the anode tracks A, while the other terminal of the secondary winding is connected to the component electrode track A' or, if appropriate, to the component electrode tracks. The circuit arrangement also has a lamp voltage generator U2 that is connected, on the one hand, to the anode tracks A and, on the other hand, to the cathode tracks K. The lamp voltage generator U2 supplies a pulsed voltage train suitable for pulsed power injection, and can be implemented, for example, as disclosed in the publication U.S. Pat. No. 6,323,600. Other controllable switches can also be used instead of the FETs M1, M2.

Reference is now made to the two FIGS. 1 and 2 for the following functional description. At the start of the ignition phase, the lamp voltage generator U2 is already supplying the pulsed operating voltage that is present between the anode tracks A and the cathode tracks K. The field-effect transistor M1 is now driven in a pulsed fashion via its control input X. A high voltage is thereby generated between the anodes A and the component electrode A' on the secondary side of the ignition transformer TR1. This ignites an auxiliary discharge (not visible in FIG. 1, since normal operation is illustrated there) in the region of the gap L. The auxiliary discharge initiates the main discharge, comprising the partial discharges E.

At the start of the normal operation that now follows, the first field-effect transistor M1 is controlled into a high-resistance state. The second field-effect transistor M2 is, by contrast, controlled via its control input Y into a conducting, that is to say low-resistance state, and thus short-circuits the ignition transformer TR1 on the primary side. The two terminals on the secondary side of the ignition transformer TR1 and, consequently, also the anode tracks A and the component electrode track A' connected there are thus at the same electric potential. In this way, the operating voltage U2 also acts in normal operation between the component electrode track A' and the cathode tracks K. This ensures that partial discharges E likewise also burn in normal operation between the component electrode track A' and the nearest cathode track K. This has the advantage that the component electrode track A' is used not only for the ignition auxiliary discharge, but also for the main discharge. This region would otherwise be dark during normal operation, which is not desired.

Although the invention has been explained in great detail above using the example of a flat lamp, it is in no way restricted to this type of lamp. Rather, the invention can also be used in the case of dielectric barrier discharge lamps with vessels of shape other than flat, without losing its advantageous effects. Thus, the invention can be applied, for example, very easily to tubular lamps with tubular discharge vessels, for example by arranging a cathode track and an anode track interrupted by the gap diametrically opposite one another on the inner side parallel to the longitudinal axis of the discharge vessel. Driving is performed in principle in the same way as described above for the flat lamp.

What is claimed is:

1. A method for igniting and operating a dielectric barrier discharge lamp with elongated electrodes (A, K), comprising the steps of:
    dividing at least one elongated electrode into two component electrodes (A, A') by a gap (L),
    in an ignition phase, applying an ignition voltage between the two component electrodes (A, A') in such a way that an auxiliary discharge is ignited in a region of the gap (L) between the two component electrodes (A, A'), and
    in normal operation, applying an operating voltage between the elongated electrodes (A, K) in such a way that a main discharge (E) burns between the electrodes (A, K).

2. The method as claimed in claim 1, in which, in normal operation, a voltage between the two component electrodes (A, A') is lower than the ignition voltage and/or a maintenance voltage of the auxiliary discharge.

3. The method as claimed in claim 1, in which, in normal operation, a voltage between the two component electrodes (A, A') is selected to be sufficiently low in order to avoid any influence being exerted on the main discharge (E).

4. The method as claimed in claim 1, in which, in normal operation, the two component electrodes (A, A') are kept at substantially the same electric potential.

5. The method as claimed in claim 1, in which, in normal operation, the operating voltage is applied between the two component electrodes (A, A') and its counter-electrode (K), that is to say the main discharge (E) also extends between each of the two component electrodes (A, A') and the neighboring counter-electrode (K).

6. The method as claimed in claim 1, in which the operating voltage is tuned to a pulsed active-power coupling into a gas discharge, whose pulse and interpulse periods are selected in such a way that the main discharge comprises numerous partial discharges (E).

7. The method as claimed in claim 6, in which a counter-electrode (K) of the two component electrodes and/or the two component electrodes is or are provided with means (V) for locating partial discharges (E) of the main discharge.

8. The method as claimed in claim 7, in which the electrode gap (L) is positioned between two of the means (V) for locating the partial discharges, that is to say between two partial discharges (E) burning during operation.

* * * * *